(No Model.)  3 Sheets—Sheet 1.

A. TITSCHER.
SAW FILING AND SETTING MACHINE.

No. 390,532.  Patented Oct. 2, 1888.

Witnesses
Inventor
August Titscher
by Wasa Theodorovic
Attorney (No Model.) 3 Sheets—Sheet 2.

A. TITSCHER.

SAW FILING AND SETTING MACHINE.

No. 390,532. Patented Oct. 2, 1888.

Witnesses

Inventor
August Titscher
by Wasa Theodrovic
Attorney (No Model.) 3 Sheets—Sheet 3.
A. TITSCHER.
SAW FILING AND SETTING MACHINE.
No. 390,532. Patented Oct. 2, 1888.
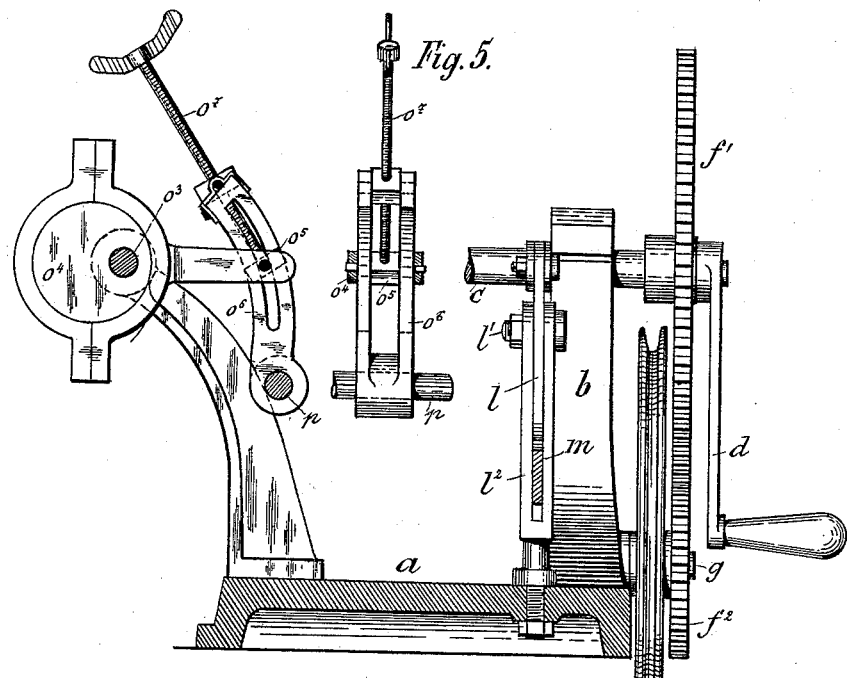
Fig. 5.
Fig. 4.
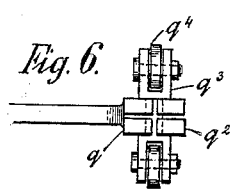
Fig. 6.
Witnesses
Inventor
August Titscher
by Wasa Chardorovic
Attorney

UNITED STATES PATENT OFFICE.

AUGUST TITSCHER, OF SCHÖNSTEIN, STYRIA, AUSTRIA-HUNGARY.

SAW FILING AND SETTING MACHINE.

SPECIFICATION forming part of Letters Patent No. 390,532, dated October 2, 1888.

Application filed April 16, 1888. Serial No. 270,751. (No model.)

*To all whom it may concern:*

Be it known that I, AUGUST TITSCHER, a subject of the Emperor of Austria, residing at Schönstein, Styria, Austria-Hungary, have invented new and useful Improvements in Saw Filing and Setting Machines, of which the following is a specification.

My invention relates to improvements in saw filing and setting machines for saws of every kind—for instance, joiners' saws, band-saws, circular saws, &c. I am aware that prior to my invention saw filing and setting machines have been already used; but the same are objectionable, being too complicated, especially in regard to the adjustment of the working parts, according to the different kinds and sizes of saws and to the holdfasts or screw-clamps which hold the saw-blade while being sharpened or filed.

My machine has all working parts adjustable, so that the machine (within certain limits) may be employed for saws with any pitch and depth of blade and amount of set. My machine may also be employed for saws with a straight blade as well as for circular saws, and especially the holding devices are very simple, as this is effected by the saw-setting tool.

Figures 1, 2:
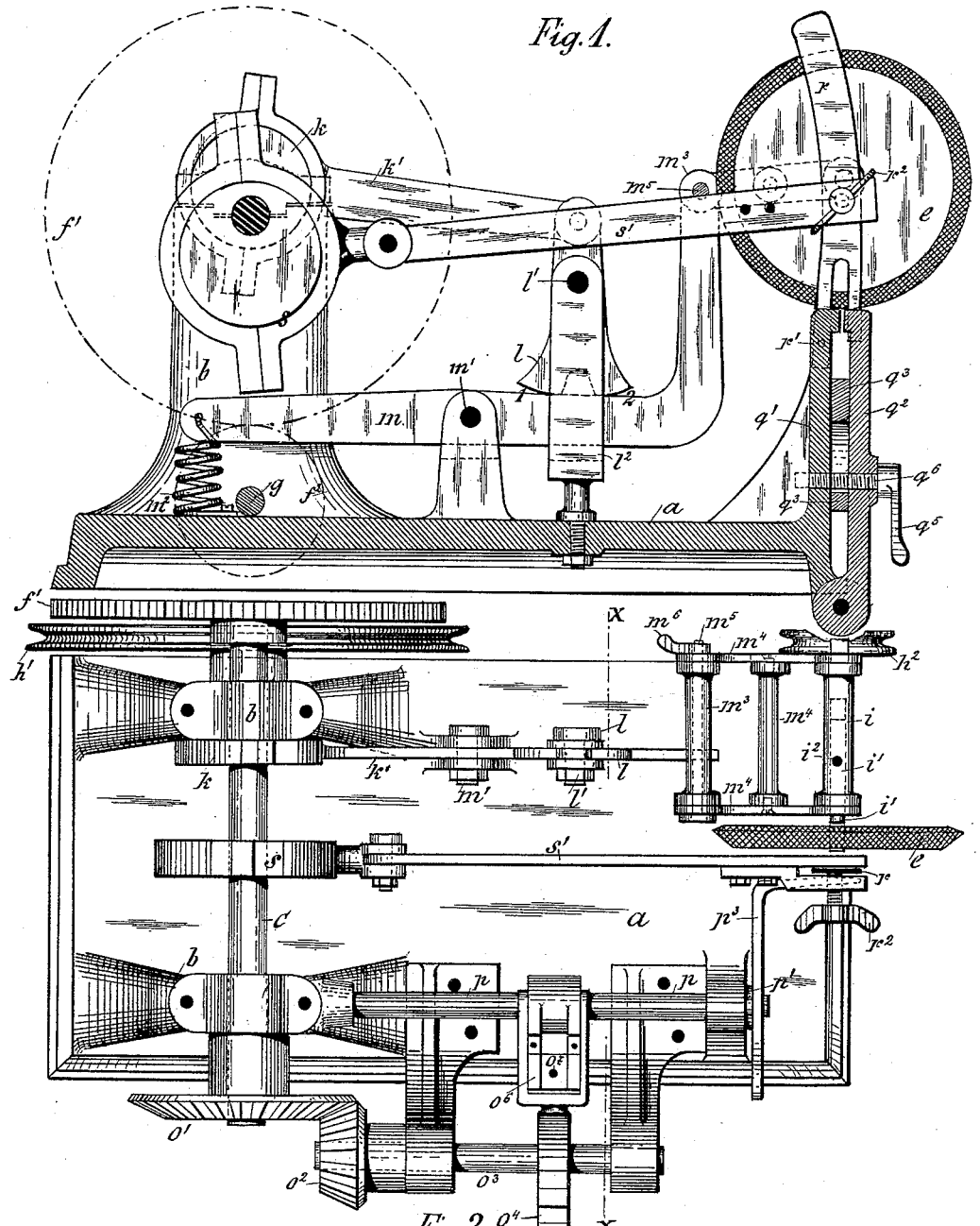
Figure 3:
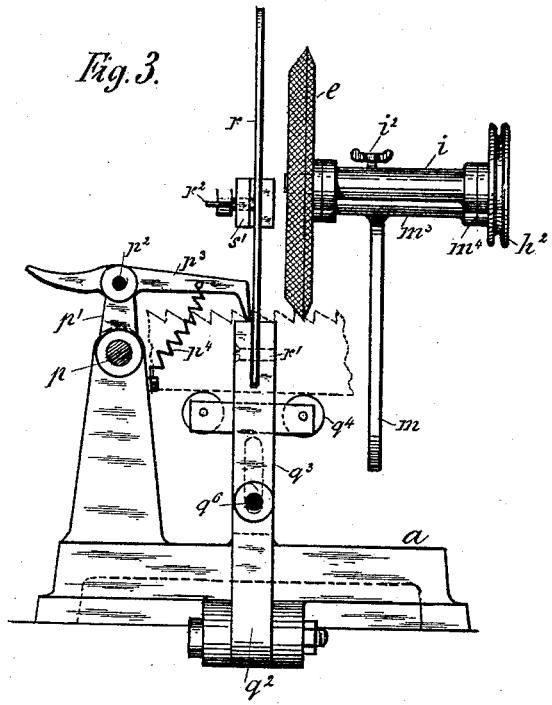
Figure 7:
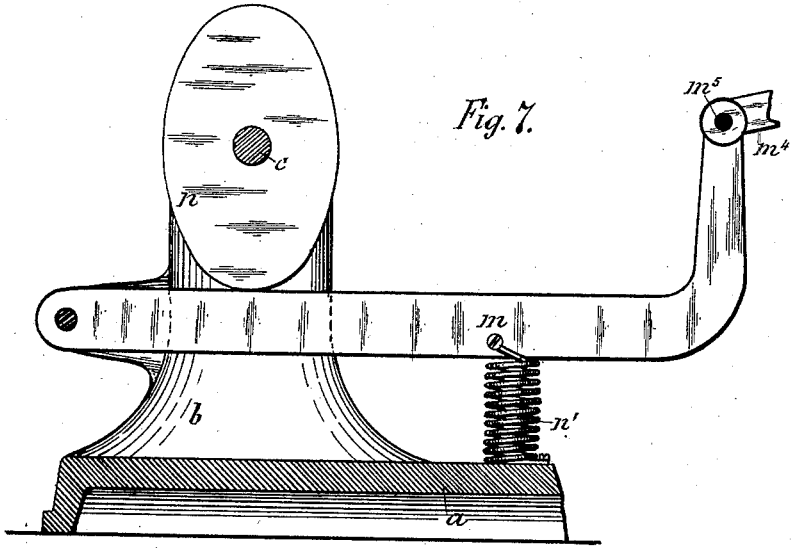

In the annexed drawings, Figure 1 represents a vertical longitudinal section of the machine. Fig. 2 is a plan view; Fig. 3, a front view; Fig. 4, a cross-section on the line $x\ x$ of Fig. 2. Fig. 5 represents a side view of the connecting-link with slot for adjusting and regulating the feed motion. Fig. 6 represents a top view of the vise-shaped guide. Fig. 7 represents a modification of the mechanism for raising and lowering the sharpening or filing disk.

Similar letters refer to similar parts throughout the several views.

Figs. 3 to 7 are detail views of such mechanisms as are peculiar to the invention. Upon a bed-plate, $a$, the driving-shaft $c$ is journaled in two bearings, $b$, said shaft being rotated by means of a crank, $d$, or by any other suitable gear. From the shaft $c$ are derived the following motions: first, the rotary and raising and lowering motion of the filing-disk; second, the feed motion; third, the oscillating motion of the setting-tool, which effects also the clamping or holding of the saw-blade during the operation of filing or sharpening.

The file-disk $e$ is revolved by the following mechanism: By the spur-gear $f'\ f^2$, (or by any other gear,) the grooved pulley $h'$, mounted on the gudgeon $g$ of the tooth-wheel $f^2$, is rotated and transmits its motion to the little grooved pulley $h^2$. The latter is fixed on the shaft $i$, which is partly or entirely (on the whole length) hollow, and which receives a solid shaft, $i'$, upon which is mounted the file-disk $e$. The solid and hollow shafts $i$ and $i'$ are firmly connected by means of an adjusting-screw, $i^2$, so that both shafts $i$ and $i'$ rotate together.

The solid shaft $i'$ slides in the hollow shaft $i$, so that the distance between the set-iron $r$ and the circumference of the file-disk $e$ may be adjusted, as otherwise it might happen that for a certain pitch the edge of the setting-tool would face a tooth and the file-disk might bear against the point or tip of a tooth instead of against a space between two teeth.

In order to raise the file-disk during the feed-motion of the saw-blade, I employ the following mechanism: Upon the shaft $c$ is mounted an eccentric, $k$, which causes an oscillating (rocking) motion of the double cam $l$ by means of the connecting-rod $k'$. This double cam turns about the fixed pivot $l'$, carried in the forked standard $l^2$. The said double cam has two eccentric pressing-faces, 1 and 2, so that during one revolution of the shaft $c'$ it presses twice upon the lever $m$. This lever $m$ may be turned about the pivot $m'$ and is pressed down by the double cam $l$ and raised by a spring, $m^2$. The vertical extremity of the lever $m$ carries a cross-bar, $m^3$, which is connected with an I-shaped frame, $m^4$, the side pieces or shanks of which carry before-mentioned shaft $i$. This I-shaped frame $m^4$ turns about the bolt $m^5$, and can be fixed in a suitable position by tightening a thumb-nut, $m^6$. This has for its object to adjust the elevation of the file-disk according to the shape of the tooth.

A modification of the mechanism for raising and lowering the file-disk is represented in Fig. 7. There the pressing down of the lever $m$ bearing the I-shaped frame is effected by means of an eccentric or cam disk, $n$, which is so curved that it presses down the lever $m$ twice during one revolution of the shaft $c$. In order to raise the lever $m$, I employ a spiral spring, $n'$.

The feed motion is derived from or caused by the shaft $c$ by means of the bevel-gear $o' o^2$, for which, however, may be substituted any other gear—for instance, worm and worm-wheel, friction-wheels, &c., the transmission being in the ratio of two to one, so that the cross-shaft $o^3$ rotates with double the speed of the shaft $c$. Upon the shaft $o^3$ is mounted an eccentric, $o^4$, the rod of which engages with its forked-shaped extremity the pins of a sliding piece, $o^5$, which may be raised or lowered in a guide, $o^6$, by means of a screw, $o^7$. The guide-piece with slot-hole transmits a rocking motion to the shaft $p$, derived from the eccentric $o^4$. On the end of this shaft is mounted a small lever, $p'$, which bears the pawl $p^3$, turning about the pin $p^2$ and pulled down in the space between two teeth of the saw by means of a spring, $p^4$. By this arrangement the shaft $p$ and the pawl $p^3$ receive a rocking or oscillating motion from the eccentric $o^4$, which oscillating motion effects the feed motion of the saw-blade to be filed. In order to effect a greater or less feed motion, according to the pitch of the saw, the sliding piece $o^5$ is adjusted in the guide-piece, which causes a greater or less motion of the shaft $p$.

For the guiding of the saw-blade for saws with straight blades, (for instance, joiner's saws, band-saws, &c.,) I employ a vise-shaped mechanism consisting of a stationary jaw, $q'$, and of a movable jaw, $q^2$. Between the same may slide up and down a small support, $q^3$, which carries the guide-rollers $q^4$. The jaws $q' q^2$ are pressed together by means of a thumb-nut, $q^5$, which causes the fixing of the support $q^3$.

For circular saws the saw is put upon the bolt $q^6$, which passes then through slots of both jaws $q' q^2$, and terminates in a head. The feed-motion is effected in a similar way, only the pawl must be curved more outwardly.

The setting-tool $r$, which is slotted at its lower extremity, turns about the pin $r'$ on the jaw $q'$, and moves in a narrow slot in the jaws $q' q^2$. Upon the shaft $c$ is mounted an eccentric, $s$, which operates a connecting-rod, $s'$, between the fork-shaped end of which is placed the setting-tool $r$.

The connecting-rod $s'$ may be fixed in any suitable height from the pivot $r'$ by an adjustable set-screw, $r^2$. This arrangement may be varied—for instance, the setting-tool $r$ may be provided with holes through which (and through a hole of the connecting-rod $s'$) passes a pin or bolt. By raising or lowering the connecting-rod $s'$ on the setting-tool $r$ a greater or less setting is effected.

The situation of the eccentrics must be arranged in such a manner that while the file-disk moves down and files, the setting-tool is moved forward or backward. The feed-pawl, however, makes no motion, but as soon as the file-disk is raised the setting-tool—that is to say, the slot of it—must be vertical, so that the saw-blade can pass through it at the same time as the motion of the pawl $p^3$ takes place.

Having fully described my invention, what I desire to claim, and secure by Letters Patent, is—

In a saw filing and setting machine, the combination of the main frame, the driving-shaft $c$, carrying the gearing and cams, as described, the pivoted lever $m$, the file-disk supported by one end of said lever, the spring $m^2$, pivoted cam $l$, and connecting-link $k'$, substantially as described.

In testimony whereof I signed this specification in the presence of two subscribing witnesses.

AUGUST TITSCHER.

Witnesses:
 EDMUND JUSSEN,
 H. KRAUS.